US011969904B2

(12) United States Patent
Chen et al.

(10) Patent No.: US 11,969,904 B2
(45) Date of Patent: Apr. 30, 2024

(54) REGISTRATION SYSTEM AND METHOD FOR ROBOT-ORIENTED AUGMENTED REALITY TEACHING SYSTEM

(71) Applicant: QINGDAO TECHNOLOGICAL UNIVERSITY, Shandong (CN)

(72) Inventors: Cheng Jun Chen, Shandong (CN); Xu Tong Ding, Shandong (CN); Yong Pan, Shandong (CN); Dong Nian Li, Shandong (CN); Jun Hong, Shandong (CN)

(73) Assignee: QINGDAO UNIVERSITY OF TECHNOLOGY, Shandong (CN)

( * ) Notice: Subject to any disclaimer, the term of this patent is extended or adjusted under 35 U.S.C. 154(b) by 441 days.

(21) Appl. No.: 17/417,416

(22) PCT Filed: Mar. 24, 2020

(86) PCT No.: PCT/CN2020/080786
§ 371 (c)(1),
(2) Date: Jun. 23, 2021

(87) PCT Pub. No.: WO2021/189224
PCT Pub. Date: Sep. 30, 2021

(65) Prior Publication Data
US 2022/0324117 A1   Oct. 13, 2022

(51) Int. Cl.
*B25J 9/16*       (2006.01)
*B25J 9/02*       (2006.01)
(52) U.S. Cl.
CPC ............ *B25J 9/1697* (2013.01); *B25J 9/023* (2013.01); *B25J 9/163* (2013.01); *B25J 9/1653* (2013.01)
(58) Field of Classification Search
CPC . B25J 9/1697; B25J 9/023; B25J 9/163; B25J 9/1653; B25J 9/1656; B25J 9/1671;
(Continued)

(56) References Cited

U.S. PATENT DOCUMENTS

2016/0278875 A1* 9/2016 Crawford .............. A61B 90/98
2017/0119339 A1* 5/2017 Johnson ................. A61B 6/58
(Continued)

FOREIGN PATENT DOCUMENTS

CN      107309882 A  * 11/2017  ............. B25J 13/00
CN      108481323 A     9/2018
(Continued)

OTHER PUBLICATIONS

International Search Report dated Dec. 17, 2020, issued in application No. PCT/CN2020/080786.
(Continued)

*Primary Examiner* — Mary Cheung
(74) *Attorney, Agent, or Firm* — McClure, Qualey & Rodack, LLP

(57) ABSTRACT

A registration system for robot-oriented augmented reality teaching system, comprising: a physical robot unit, a registration unit, a virtual robot generation unit and a computer; the physical robot unit comprising a physical robot, a physical robot controller and a robot point-to-point intermittent movement control program; the physical robot provided thereon with a physical robot base coordinate system; the physical robot controller connected with the physical robot and the computer respectively; the robot point-to-point intermittent movement control program installed in the computer; the registration unit comprising a registration marker, a camera and a conversion calculation unit; the registration marker arranged on the physical robot body; the camera fixed in a physical environment except the physical robot; the camera connected with the computer, and the conversion calculation unit arranged in the computer; the virtual robot generation unit arranged in the computer and used for generating a virtual robot model.

12 Claims, 3 Drawing Sheets

(58) Field of Classification Search
CPC . G05B 2219/39451; G06T 7/70; G09G 5/377
See application file for complete search history.

(56) References Cited

U.S. PATENT DOCUMENTS

| | | | |
|---|---|---|---|
| 2019/0029765 A1* | 1/2019 | Crawford | A61B 90/361 |
| 2019/0389069 A1* | 12/2019 | Kalbavi | G06F 3/0346 |
| 2020/0297228 A1* | 9/2020 | Crawford | A61B 90/14 |
| 2021/0023694 A1 | 1/2021 | Chen et al. | |

FOREIGN PATENT DOCUMENTS

| | | |
|---|---|---|
| CN | 110238831 A | 9/2019 |
| CN | 209373826 U | 9/2019 |
| CN | 110815189 A | 2/2020 |
| WO | 2020055909 A1 | 3/2020 |

OTHER PUBLICATIONS

Written Opinion dated Dec. 17, 2020, issued in application No. PCT/CN2020/080786.

\* cited by examiner

REGISTRATION SYSTEM AND METHOD FOR ROBOT-ORIENTED AUGMENTED REALITY TEACHING SYSTEM

TECHNICAL FIELD

The invention relates to a registration system and a registration method for robot-oriented augmented reality teaching system, and belongs to the field of intelligent manufacturing and robot teaching.

BACKGROUND

Currently, augmented reality technology is increasingly used in manufacturing. Augmented reality registration technology precisely overlaying virtual objects and virtual information in the real world, so that an observer can see a scene combining virtuality and reality, and a virtual objects are considered to be a part of the surrounding real world from a sense. The augmented reality registration technology is one of the vital technologies in the augmented reality system, and has important significance for realizing the augmented reality system. According to the robot augmented reality teaching system, a virtual robot model is precisely overlain in a physical production environment, an operator uses a human-computer interaction device to drive the virtual robot model to move for planning a path for the robot in a virtual-real overlying scene.

An augmented reality registration technical solution in patent 基于 RGB-D 图像及示教器的机器人示教系统及方法 (A Robot Teaching System and Method Based on RGB-D Images and a Demonstrator) (publication No. CN 201910665326.9) is that: an AR registration card is placed manually, a computer collects an image of the AR registration card by a camera, an marker on the AR registration card is detected by a machine vision and augmented reality registration algorithm, a transformation matrix between the camera and the AR registration card is calculated, the computer sets the orientation of a virtual camera in a virtual world with the transformation matrix, and a virtual robot model is precisely placed at the position of the AR registration card in the image. However, in this technical solution, the AR registration card needs to be placed in advance, and if the coordinates of the virtual robot base coordinate and the AR registration card do not coincide, the conversion relation between the coordinates of the two coordinate systems needs to be measured in advance. In addition, in the case of a physical robot, in order to make the base coordinate system of the virtual robot consistent with that of the physical robot, the method needs to measure the transformation matrix between the AR registration card and the base coordinate system of the robot in advance, and the method has poor man-machine interactivity and is not suitable for remote robot teaching and teaching of a mobile industrial robot (an industrial robot placed on a mobile platform such as an AGV).

SUMMARY

In order to solve the technical problems, the invention provides a registration system and a registration method for robot-oriented augmented reality teaching system, which can achieve augmented reality registration without installing an AR registration card in advance on a physical entity except a robot, and achieve the consistency of a virtual robot model base coordinate system and a physical robot base coordinate system, suitable for industrial robot remote augmented reality teaching system and mobile industrial robot augmented reality teaching system.

The technical solutions adopted by the invention are as follows:

Technical Solution 1

A registration system for robot-oriented augmented reality teaching system, comprising a physical robot unit, a registration unit, a virtual robot generation unit and a computer;

the physical robot unit comprising a physical robot, a physical robot controller and a robot point-to-point intermittent movement control program; the physical robot provided thereon with a physical robot base coordinate system; the physical robot controller connected with the physical robot and the computer respectively, and used for controlling the physical robot to move and obtaining the movement track of the physical robot; the computer sending the robot point-to-point intermittent movement control program the physical robot controller, and the robot point-to-point intermittent movement control program executed by the physical robot controller to control the execution mechanism of the physical robot to perform at least three or more fold line movements;

the registration unit comprising a registration marker, a camera and a conversion calculation unit; the registration marker arranged on the physical robot body; the camera fixed in a physical environment except the physical robot and shooting focused on a working area of the physical robot; the camera connected with the computer, and the conversion calculation unit arranged in the computer and used for calculating the conversion relation between the three-dimensional coordinates of the registration marker in the camera coordinate system and the three-dimensional coordinates of the registration marker in the physical robot base coordinate system;

the virtual robot generation unit arranged in the computer and used for generating a virtual robot model.

The registration marker is arranged on the execution mechanism at the end of the physical robot, and the registration marker is an object having a characteristic shape or a color.

Alternatively, the registration marker is arranged on a joint of the physical robot, and the registration marker is an object having a characteristic shape or a color.

Further, the computer is specifically configured to: at each intermittent point of the intermittent movement, the computer reading the three-dimensional coordinates of the registration marker in the physical robot base coordinate system by the robot controller; meanwhile, obtaining an image of a physical working environment by camera, identifying the registration marker by a computer vision algorithm, and calculating pixel coordinates of the registration marker in a pixel coordinate system.

Further, the conversion calculation unit is specifically configured to: calculate the conversion relation between the camera coordinate system and the physical robot base coordinate system by constructing a least squares problem according to the pixel coordinates of the registration marker in the pixel coordinate system and the three-dimensional coordinates of the registration marker in the physical robot base coordinate system by using the imaging model of the camera and the internal reference matrix of the camera.

Technical Solution 2

A registration method for robot-oriented augmented reality teaching system, implemented based on the registration system for robot-oriented augmented reality teaching system of Technical Solution 1, and comprises the following steps:
- installing a registration marker on the physical robot, and fixing a camera;
- programing a robot point-to-point intermittent movement control program on a computer and sending the robot point-to-point intermittent movement control program to a physical robot controller, wherein the robot point-to-point intermittent movement control program controls at least an execution mechanism of the physical robot to perform at least three or more fold line movements;
- downloading the programed robot point-to-point intermittent movement control program to the physical robot controller, wherein the physical robot controller executes the robot point-to-point intermittent movement control program to control the physical robot to act;
- a camera shooting an image and sending the image to a computer, the computer calculating pixel coordinates of a registration marker in the image, and meanwhile the computer obtaining three-dimensional coordinates of the registration marker in a physical robot base coordinate system by a physical robot controller;
- the conversion calculation unit reading the pixel coordinates of the registration marker in the image and the three-dimensional coordinates of the registration marker in the physical robot base coordinate system, and calculating the conversion relation between the camera coordinate system and the physical robot base coordinate system;
- the virtual robot generation unit generating a virtual robot model consistent with the physical robot base coordinate system according to the calculation of the conversion relation between camera coordinate system and the physical robot base coordinate system, and completing registration by means of overlying the virtual robot model in a real scene through augmented reality equipment.

Further, the registration marker is arranged on an execution mechanism at the end of the physical robot, and the registration marker is an object having a characteristic shape or a color.

Alternatively, the registration marker is disposed on a joint of the physical robot, and the registration marker is an object having a characteristic shape or a color.

Further, in the step of the camera shooting an image and sending the image to a computer, the computer calculating pixel coordinates of a registration marker in the image, and meanwhile the computer obtaining three-dimensional coordinates of the registration marker in a physical robot base coordinate system by a physical robot controller: at each intermittent point of the intermittent movement, the computer controls the camera to shoot and simultaneously reads the three-dimensional coordinates of the current registration marker in the physical robot base coordinate system.

Further, the step of the conversion calculation unit reading the pixel coordinates of the registration marker in the image and the three-dimensional coordinates of the registration marker in the physical robot base coordinate system, and calculating the conversion relation between the camera coordinate system and the physical robot base coordinate system comprises:
- the conversion calculation unit calculating the conversion relation between the camera coordinate system and the physical robot base coordinate system by constructing a least squares problem according to the pixel coordinates of the registration marker in the pixel coordinate system and the three-dimensional coordinates of the registration marker in the physical robot base coordinate system by using the imaging model of the camera and the internal reference matrix of the camera.

The invention has the following beneficial effects:
1. The registration system and method to the robot-oriented augmented reality teaching system can achieve augmented reality registration without installing an AR registration card in advance on a physical entity except the robot, achieve the consistency of a virtual robot model base coordinate system and a physical robot base coordinate system, and is suitable for the industrial robot remote augmented reality teaching system and the mobile industrial robot augmented reality teaching system;
2. The influence of the installation precision of the AR registration card on the augmented reality registration precision is avoided due to without needing to be installed the AR registration card in the physical scene, so as to achieve the consistency of the virtual robot base coordinate system and the physical robot base coordinate system with high precision, and improve the precision of the teaching path.

DETAILED DESCRIPTION OF THE EMBODIMENTS

The invention is described in detail below with reference to the drawings and the specific embodiments.

Embodiment 1

Figure 1:
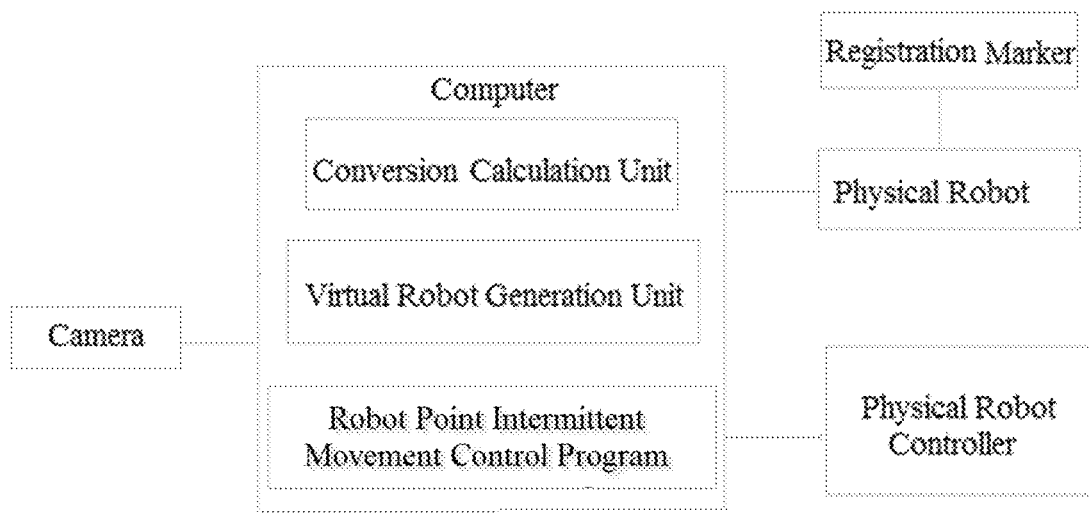
FIG. 1 is a schematic diagram of the registration system for robot-oriented augmented reality teaching system according to the present invention.
Figure 2:
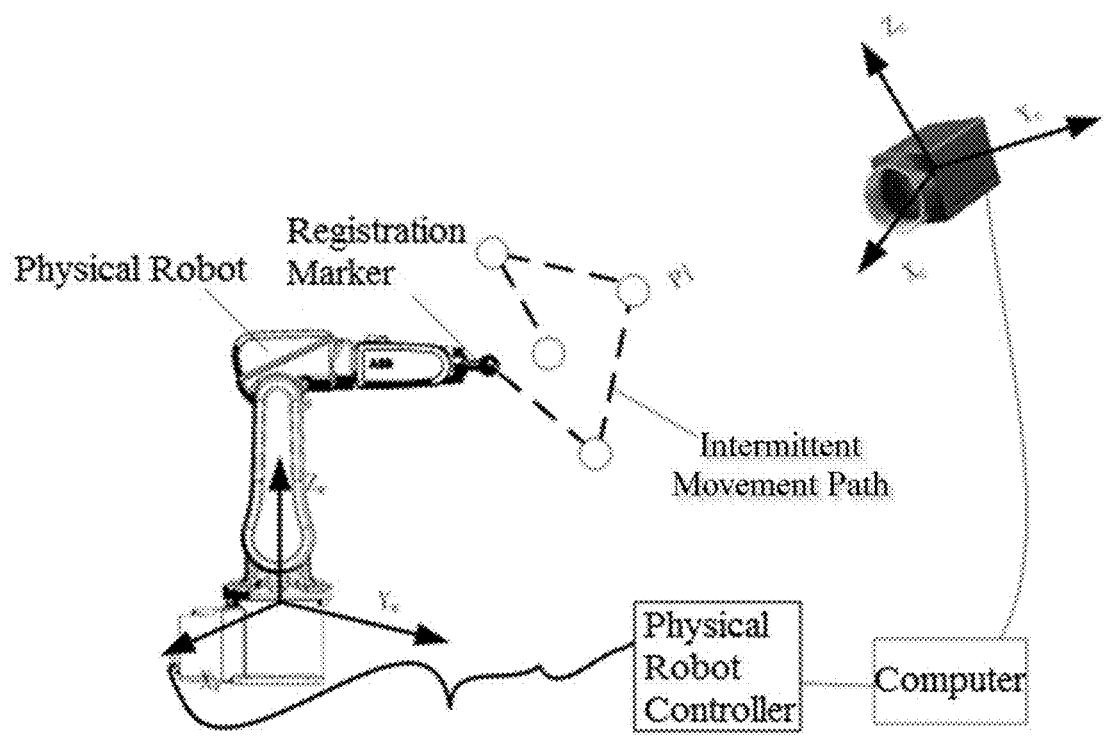
FIG. 2 is a usage diagram for the registration system for robot-oriented augmented reality teaching system according to the present invention.

Referring to FIG. 1 and FIG. 2, a registration system for robot-oriented augmented reality teaching system comprises a physical robot unit, a registration unit, a virtual robot generation unit and a computer;
- the physical robot unit comprises a physical robot, a physical robot controller and a robot point-to-point intermittent movement control program; the physical robot is provided thereon with a physical robot base coordinate system; the physical robot controller is respectively connected with the physical robot and the computer, and is used for controlling the physical robot to move and obtaining the movement track of the physical robot; the robot point-to-point intermittent movement control program is installed in the computer, the computer sends the point-to-point intermittent movement control program to the physical robot controller, the physical robot controller executes the robot intermittent movement control program for controlling an execution mechanism of the physical robot to perform at least three or more fold line movements and control the robot to pause movements at the turning point of the fold line segment;

the registration unit comprises a registration marker, a camera and a conversion calculation unit; the registration marker is arranged on the physical robot body; the camera is fixed in a physical environment except the physical robot and shoots focused on a working area of the physical robot; the camera is connected with the computer, and the conversion calculation unit is arranged in the computer and used for calculating the conversion relation between the three-dimensional coordinates of the registration marker in the camera coordinate system and the three-dimensional coordinates of the registration marker in the physical robot base coordinate system;

the virtual robot generation unit is arranged in the computer and used for generating a virtual robot model.

In this embodiment, augmented reality registration can be achieved without installing AR registration card in advance on the physical entity except the physical robot, avoiding the influence of AR registration card installation precision to augmented reality registration precision, so as to achieve the consistency of virtual robot base coordinate system and physical robot base coordinate system with high precision, improve the precision of teaching path, and be suitable for the remote augmented reality teaching system of industrial robot and the augmented reality teaching system of mobile industrial robot.

Embodiment 2

Further, the registration marker is arranged on an execution mechanism at the end of the physical robot, and can read the coordinates of the registration marker in a robot coordinate system in real time. In order to detect and calculate conveniently, the registration marker is an object having a characteristic shape (such as a sphere, a cube and the like) or a color (such as red and yellow).

Alternatively, the registration marker is arranged on a joint of the physical robot, and can read robot joint data in real time. Coordinates of the marker in a robot coordinate system are obtained by a positive kinematics model of the robot, and the registration marker is an object having a characteristic shape or a color for convenient detection and calculation.

Further, the computer is specifically configured to: at each intermittent point of the intermittent movement, namely the end point of each line segment in the intermittent movement, the computer reads the three-dimensional coordinates $P_i(x_{wi}, y_{wi}, z_{wi})$ of the registration marker under a physical robot base coordinate system $O_w\text{—}X_wY_wZ_w$ by the robot controller; meanwhile, an image of a physical working environment is obtained by a camera, the registration marker is identified on the computer by a computer vision algorithm, and the pixel coordinate $Z_i(u_i, v_i)$ of the registration marker in a pixel coordinate system is calculated. Referring to the intermittent movement path in FIG. 2, the intermittent movement track of the robot at least comprises 3 or more fold line segments, so that data of at least 4 non-collinear feature points (e.g. 4 end points of a square) can be obtained, i.e. data of 4 $P_i$.

Further, the conversion calculating unit is specifically configured to calculate a transformation matrix R: assuming that the transformation matrix from the world coordinate system to the camera coordinate system is R, the following relation can be obtained by using the imaging model of the camera:

$$z_{c_i}\begin{bmatrix}u_i\\v_i\\1\end{bmatrix} = A_{3*4}\begin{bmatrix}x_{ci}\\y_{ci}\\z_{c_i}\\1\end{bmatrix} = A_{3*4}R_{4*4}\begin{bmatrix}x_{wi}\\y_{wi}\\z_{w_i}\\1\end{bmatrix}$$

wherein $A_{3*4}$ is the internal reference matrix of the camera and $Q_i(x_{ci}, y_{ci}, z_{ci})$ is the three-dimensional coordinates of the registration markers in the camera coordinate system $O_c\text{—}X_cY_cZ_c$.

based on the pixel coordinates $Z_i(u_i, v_i)$ of all the feature points (4 and more) and the corresponding three-dimensional coordinates $P_i(x_{wi}, y_{wi}, z_{wi})$, the following formula is targeted $$R_{4*4} = \underset{R}{\mathrm{argmin}}\, \Sigma_{i=1}^n \left(\omega_i * \|(A_{3*4}R_{4*4}P_i) - Z_i\|^2\right)$$

solving a transformation matrix $R_{4*4}$ by a least squares rigid transposition method through singular value decomposition, and realizing the conversion from a physical robot base coordinate system $O_w\text{—}X_wY_wZ_w$ to a camera coordinate system $O_c\text{—}X_cY_cZ_c$ by using the matrix $R_{4*4}$, namely, the transformation matrix from a world coordinate system to the camera coordinate system is R.

Finally, setting the position of a virtual camera in the virtual world by using the transformation matrix R, and overlying the virtual robot model on the position of the physical robot on an image shot by the camera to complete augmented reality registration, so that the consistency of the virtual robot model base coordinate system and the physical robot base coordinate system is achieved.

Embodiment 3

Figure 3:
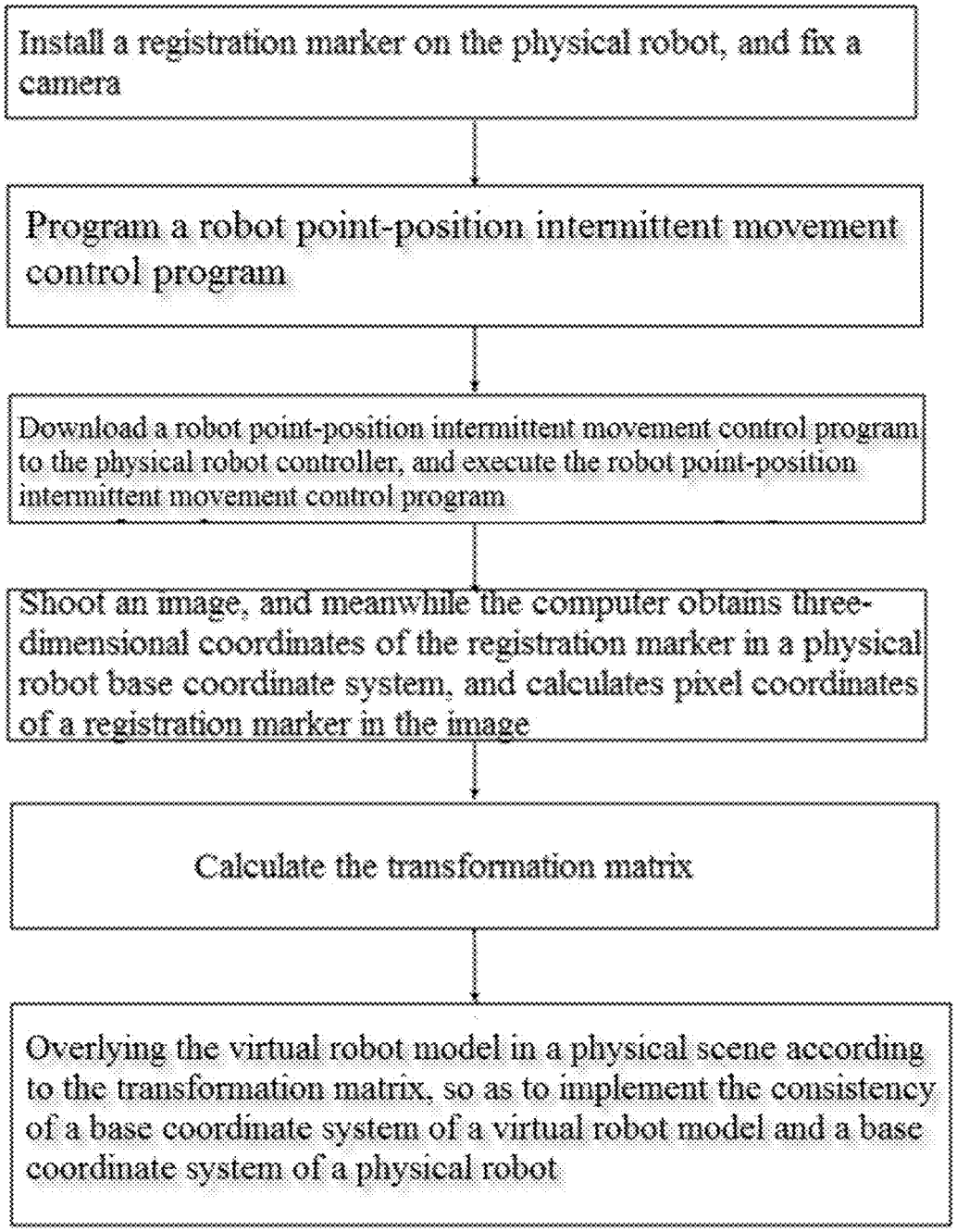
FIG. 3 is a flow diagram of the registration method for robot-oriented augmented reality teaching system according to the present invention.

Referring to FIG. 3, a registration method for robot-oriented augmented reality teaching system is achieved based on the registration system for robot-oriented augmented reality teaching system as described in embodiment 1, and comprises the following specific steps:

installing a registration marker on the physical robot, and fixing a camera;

programing a robot point-to-point intermittent movement control program on a computer and sending the robot point-to-point intermittent movement control program to a physical robot controller, wherein the robot point position intermittent movement control program at least controls an execution mechanism of the physical robot to perform at least three or more fold line movements;

downloading the programed robot point-to-point intermittent movement control program to the physical robot controller, wherein the physical robot controller executes the robot point-to-point intermittent movement control program to control the physical robot to act;

the camera shooting an image and sending the image to the computer, the computer calculating pixel coordinates of the registration marker in a pixel coordinate system, and meanwhile the computer obtaining three-dimensional coordinates of the registration marker in a physical robot base coordinate system by a physical robot controller;

the conversion calculation unit reading the pixel coordinates of the registration marker in the image and the three-dimensional coordinates of the registration marker in the physical robot base coordinate system, and calculating the conversion relation between the camera coordinate system and the physical robot base coordinate system;

and the virtual robot generation unit generating a virtual robot model consistent with the physical robot base coordinate system according to the conversion relation between the calculation camera coordinate system and the physical robot base coordinate system, and overlying the virtual robot model in a real scene by augmented reality equipment to complete registration.

This embodiment can implement augmented reality registration without installing AR registration card in advance on the physical entity except the physical robot, avoiding the influence of AR registration card installation precision to augmented reality registration precision, and can implement the consistency of virtual robot base coordinate system and physical robot base coordinate system with high precision, improve the precision of teaching path, and can be suitable for the remote augmented reality teaching system of industrial robot and the augmented reality teaching system of mobile industrial robot.

Embodiment 4

Further, the registration marker is arranged on an execution mechanism at the end of the physical robot, and can read the coordinates of the registration marker in a robot coordinate system in real time. In order to detect and calculate conveniently, and the registration marker is an object having a characteristic shape (such as a sphere, a cube and the like) or a color (such as red and yellow).

Alternatively, the registration marker is arranged on a joint of the physical robot, so that robot joint data can be read in real time, coordinates of the marker in a robot coordinate system are obtained by a positive kinematics model of the robot, and the registration marker is an object having a characteristic shape or a color for convenient detection and calculation.

Further, the camera shoots an image and sends the image to the computer, the computer calculates the pixel coordinates of the registration marker in the image, and meanwhile, the computer obtains the three-dimensional coordinates of the registration marker in the physical robot base coordinate system by the physical robot controller: and at each intermittent point of the intermittent movement, the computer controls the camera to shoot, identifies the registration marker, calculates the pixel coordinate $Z_i(u_i, v_i)$ of the registration marker in a pixel coordinate system, and simultaneously reads the three-dimensional coordinate $P_i(x_{wi}, y_{wi}, z_{wi})$ of the current registration marker in a physical robot base coordinate system $O_w$—$X_w Y_w Z_w$.

Further, the step of reading the pixel coordinates of the registration marker in the image and the three-dimensional coordinates of the registration marker in the physical robot base coordinate system by the conversion calculation unit, and calculating the conversion relation between the camera coordinate system and the physical robot base coordinate system specifically comprises:

assuming that the transformation matrix from the world coordinate system to the camera coordinate system is R, the following relation can be obtained by using the imaging model of the camera:

$$z_{c_i}\begin{bmatrix}u_i\\v_i\\1\end{bmatrix} = A_{3*4}\begin{bmatrix}x_{ci}\\y_{ci}\\z_{ci}\\1\end{bmatrix} = A_{3*4}R_{4*4}\begin{bmatrix}x_{wi}\\y_{wi}\\z_{wi}\\1\end{bmatrix}$$

wherein $A_{3*4}$ is the internal reference matrix of the camera and $Q_i(x_{ci}, y_{ci}, z_{ci})$ is the three-dimensional coordinates of the registration markers in the camera coordinate system $O_c$—$X_c Y_c Z_c$;

based on the pixel coordinates $Z_i(u_i, v_i)$ of all the feature points (4 and more) and the corresponding three-dimensional coordinates $P_i(x_{wi}, y_{wi}, z_{wi})$, the following formula targeted:

$$R_{4*4} = \underset{R}{\operatorname{argmin}} \Sigma_{i=1}^n (\omega_i * \|(A_{3*4}R_{4*4}P_i) - Z_i\|^2)$$

solving a transformation matrix $R_{4*4}$ by a least squares rigid transposition method by singular value decomposition, and realizing the conversion from a physical robot base coordinate system $O_w$—$X_w Y_w Z_w$ to a camera coordinate system $O_c$—$X_c Y_c Z_c$ by using the matrix $R_{4*4}$, namely the transformation matrix from a world coordinate system to the camera coordinate system is R;

finally, setting the position of a virtual camera in the virtual world by using the transformation matrix R, and overlying the virtual robot model on the position of the physical robot on an image shot by the camera to complete augmented reality registration, so that the consistency of the virtual robot model base coordinate system and the physical robot base coordinate system is implemented.

The above description is only the embodiments of the present invention, and is not intended to limit the scope of the present invention, and all equivalent structures or equivalent processes performed by the present invention or directly or indirectly applied to other related technical fields are fallen within the scope of the present invention.

The invention claimed is:

1. A registration system for robot-oriented augmented reality teaching system, comprising:
   a physical robot unit, a registration unit, a virtual robot generation unit and a computer;
   the physical robot unit comprising a physical robot, a physical robot controller and a robot point-to-point intermittent movement control program; the physical robot provided thereon with a physical robot base coordinate system; the physical robot controller connected with the physical robot and the computer respectively, and used for controlling the physical robot to move and obtaining a movement track of the physical robot; the robot point-to-point intermittent movement control program installed in the computer and executed by the physical robot controller to control an execution mechanism of the physical robot to perform at least three or more fold line movements;

the registration unit comprising a registration marker, a camera and a conversion calculation unit; the registration marker arranged on the physical robot; the camera fixed in a physical environment except the physical robot and shooting focused on a working area of the physical robot; the camera connected with the computer, and the conversion calculation unit arranged in the computer and used for calculating conversion relation between three-dimensional coordinates of the registration marker in a camera coordinate system and three-dimensional coordinates of the registration marker in a physical robot base coordinate system;

the virtual robot generation unit arranged in the computer and used for generating a virtual robot model.

2. The registration system for robot-oriented augmented reality teaching system according to claim 1, wherein the registration marker is arranged on an execution mechanism at an end of the physical robot, and the registration marker is an object having a characteristic shape or a color.

3. The registration system for robot-oriented augmented reality teaching system according to claim 2, wherein the computer is specifically configured to: at each intermittent point of intermittent movement, the computer reading the three-dimensional coordinates of the registration marker in the physical robot base coordinate system by the physical robot controller; meanwhile, obtaining an image of a physical working environment by the camera, identifying the registration marker by a computer vision algorithm, and calculating pixel coordinates of the registration marker in a pixel coordinate system.

4. The registration system for robot-oriented augmented reality teaching system according to claim 3, wherein the conversion calculation unit is specifically configured to: calculate the conversion relation between the camera coordinate system and the physical robot base coordinate system by constructing a least squares problem according to the pixel coordinates of the registration marker in the pixel coordinate system and the three-dimensional coordinates of the registration marker in the physical robot base coordinate system by using an imaging model of the camera and an internal reference matrix of the camera.

5. The registration system for robot-oriented augmented reality teaching system according to claim 1, wherein the registration marker is arranged on a joint of the physical robot, and is an object having a characteristic shape or a color.

6. The registration system for robot-oriented augmented reality teaching system according to claim 5, wherein the computer is specifically configured to: at each intermittent point of intermittent movement, the computer reading the three-dimensional coordinates of the registration marker in the physical robot base coordinate system by the robot controller; meanwhile, obtaining an image of a physical working environment by the camera, identifying the registration marker by a computer vision algorithm, and calculating pixel coordinates of the registration marker in a pixel coordinate system.

7. A registration method for robot-oriented augmented reality teaching system, wherein the method is implemented based on the registration system for robot-oriented augmented reality teaching system of claim 1, and comprises the following steps:

installing a registration marker on the physical robot, and fixing a camera;

programing a robot point-to-point intermittent movement control program on a computer and sending the robot point-to-point intermittent movement control program to a physical robot controller, wherein the robot point-to-point intermittent movement control program controls at least one execution mechanism of the physical robot to perform at least three or more fold line movements;

downloading the programed robot point-to-point intermittent movement control program to the physical robot controller, wherein the physical robot controller executes the robot point-to-point intermittent movement control program to control the physical robot to act;

a camera shooting an image and sending the image to a computer, the computer calculating pixel coordinates of the registration marker in the image, and meanwhile the computer obtaining three-dimensional coordinates of the registration marker in a physical robot base coordinate system by the physical robot controller;

the conversion calculation unit reading the pixel coordinates of the registration marker in the image and the three-dimensional coordinates of the registration marker in the physical robot base coordinate system, and calculating the conversion relation between the camera coordinate system and the physical robot base coordinate system;

and the virtual robot generation unit generating a virtual robot model consistent with the physical robot base coordinate system according to calculation of the conversion relation between camera coordinate system and the physical robot base coordinate system, and completing registration by means of overlying the virtual robot model in a real scene through augmented reality equipment.

8. The registration method for robot-oriented augmented reality teaching system according to claim 6, wherein the registration marker is arranged on the at least one execution mechanism at an end of the physical robot, and the registration marker is an object having a characteristic shape or a color.

9. The registration method for robot-oriented augmented reality teaching system according to claim 8, wherein in the step of the camera shooting an image and sending the image to a computer, the computer calculating pixel coordinates of the registration marker in the image, and meanwhile the computer obtaining three-dimensional coordinates of the registration marker in the physical robot base coordinate system by the physical robot controller: at each intermittent point of intermittent movement, the computer controls the camera to shoot and simultaneously reads the three-dimensional coordinates of the registration marker in the physical robot base coordinate system.

10. The registration method for robot-oriented augmented reality teaching system according to claim 9, wherein the step of the conversion calculation unit reading the pixel coordinates of the registration marker in the image and the three-dimensional coordinates of the registration marker in the physical robot base coordinate system, and calculating the conversion relation between the camera coordinate system and the physical robot base coordinate system comprises:

the conversion calculation unit calculating the conversion relation between the camera coordinate system and the physical robot base coordinate system by constructing a least squares problem according to the pixel coordinates of the registration marker in a pixel coordinate system and the three-dimensional coordinates of the registration marker in the physical robot base coordinate system by using an imaging model of the camera and an internal reference matrix of the camera.

11. The registration method for robot-oriented augmented reality teaching system according to claim 6, wherein the registration marker is arranged on a joint of the physical robot, and is an object having a characteristic shape or a color.

12. The registration method for robot-oriented augmented reality teaching system according to claim 11, in the step of the camera shooting an image and sending the image to a computer, the computer calculating the pixel coordinates of the registration marker in the image, and meanwhile the computer obtaining the three-dimensional coordinates of the registration marker in the physical robot base coordinate system by the physical robot controller: at each intermittent point of intermittent movement, the computer controls the camera to shoot and simultaneously reads the three-dimensional coordinates of the registration marker in the physical robot base coordinate system.

* * * * *